US007976626B2

(12) United States Patent
Utagaki et al.

(10) Patent No.: US 7,976,626 B2
(45) Date of Patent: *Jul. 12, 2011

(54) FIBER REINFORCED CEMENT COMPOSITION AND PRODUCTS AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Corporation, Nagoya-Shi (JP)

(*) Notice: Subject to any disclaimer, the term of this patent is extended or adjusted under 35 U.S.C. 154(b) by 1260 days.

This patent is subject to a terminal disclaimer.

(21) Appl. No.: 11/527,715

(22) Filed: Sep. 27, 2006

(65) Prior Publication Data

US 2008/0072796 A1    Mar. 27, 2008

(51) Int. Cl.
*B28B 3/00* (2006.01)
(52) U.S. Cl. ........ 106/713; 106/737; 106/705; 106/716; 106/724; 106/731; 106/DIG. 1; 264/333
(58) Field of Classification Search .................. 106/713, 106/737, 705, 716, 724, 731, DIG. 1; 264/333
See application file for complete search history.

(56) References Cited

U.S. PATENT DOCUMENTS

| 3,841,885 | A | 10/1974 | Jakel | |
|---|---|---|---|---|
| 3,972,972 | A | 8/1976 | Yano et al. | |
| 4,101,335 | A * | 7/1978 | Barrable | 106/644 |
| 4,985,119 | A | 1/1991 | Vinson et al. | |
| 5,188,889 | A | 2/1993 | Nagatomi et al. | |
| 5,804,003 | A | 9/1998 | Nishizawa | |
| 5,858,083 | A | 1/1999 | Stav et al. | |
| 5,945,044 | A * | 8/1999 | Kawai et al. | 264/37.29 |
| 6,001,169 | A | 12/1999 | Kawai | |
| 6,138,430 | A * | 10/2000 | Van Acoleyen et al. | 52/745.19 |
| 6,506,248 | B1 | 1/2003 | Duselis et al. | |
| 6,572,697 | B2 * | 6/2003 | Gleeson et al. | 106/705 |
| 6,605,148 | B2 | 8/2003 | Shirakawa et al. | |
| 6,676,745 | B2 | 1/2004 | Merkley et al. | |
| 6,872,246 | B2 | 3/2005 | Merkley et al. | |
| 7,344,593 | B2 | 3/2008 | Luo et al. | |
| 7,621,087 | B2 | 11/2009 | Utagaki et al. | |
| 2001/0047741 | A1 | 12/2001 | Gleeson et al. | |
| 2003/0205172 | A1 * | 11/2003 | Gleeson et al. | 106/679 |
| 2004/0168615 | A1 | 9/2004 | Luo et al. | |
| 2005/0235883 | A1 | 10/2005 | Merkley et al. | |
| 2006/0043627 | A1 | 3/2006 | Sugita et al. | |
| 2006/0075931 | A1 | 4/2006 | Utagaki et al. | |
| 2007/0245930 | A1 | 10/2007 | Utagaki et al. | |
| 2007/0277472 | A1 * | 12/2007 | Sinclair | 52/605 |
| 2008/0072795 | A1 | 3/2008 | Utagaki et al. | |
| 2008/0072797 | A1 | 3/2008 | Utagaki et al. | |
| 2008/0148999 | A1 | 6/2008 | Luo et al. | |
| 2008/0203365 | A1 | 8/2008 | Gleeson et al. | |

FOREIGN PATENT DOCUMENTS

| JP | 49-45934 A | 5/1974 |
|---|---|---|
| JP | 49-45935 A | 5/1974 |
| JP | 54-99131 A | 8/1979 |
| JP | 58-110443 A | 7/1983 |
| JP | 1-242452 A | 9/1989 |
| JP | 1-320243 A | 12/1989 |
| JP | 3-97644 A | 4/1991 |
| JP | 3-257052 A | 11/1991 |
| JP | 04-042875 A | 2/1992 |
| JP | 04-114937 A | 4/1992 |
| JP | 4-160045 A | 6/1992 |
| JP | 4-187552 A | 7/1992 |
| JP | 04-193748 A | 7/1992 |
| JP | 04-295072 A | 10/1992 |
| JP | 5-124845 A | 5/1993 |
| JP | 05-229859 A | 9/1993 |
| JP | 6-32643 A | 2/1994 |
| JP | 6-56496 A | 3/1994 |
| JP | 6-321602 A | 11/1994 |
| JP | 6-329457 A | 11/1994 |
| JP | 7-117027 A | 5/1995 |
| JP | 07-291707 A | 11/1995 |
| JP | 7-291763 A | 11/1995 |
| JP | 08-040758 A | 2/1996 |
| JP | 9-87001 A | 3/1997 |
| JP | 10-231161 A | 9/1998 |
| JP | 11-322395 A | 11/1999 |
| JP | 2000-264701 A | 9/2000 |
| JP | 2001-158678 A | 6/2001 |
| JP | 2001-233653 A | 8/2001 |
| JP | 2001-287980 A | 10/2001 |
| JP | 2002-166406 A | 6/2002 |
| JP | 2003-146731 A | 5/2003 |
| JP | 2004-196601 A | 7/2004 |
| WO | WO 2006/025331 | 3/2006 |

OTHER PUBLICATIONS

JP 04305041 Nagata et al. abstract only Oct. 28, 1992 See U.S. Appl;. No. 11/215,964 for access to this abstract.*
JP 61256956 A Nichias Corp. abstract only Nov. 14, 1986 See U.S. Appl. No. 11/215,964 for access to this abstract.*
U.S. Appl. No. 11/354,241, K. Utagaki et al, May 15, 2006.
U.S. Appl. No. 11/410,311, K. Utagaki et al, Apr. 25, 2006.
U.S. Appl. No. 11/431,652, K. Utagaki et al, May 11, 2006.
Japanese Office Action issued on Jan. 12, 2010 in related JP Appln. No. 2004-251708.
Third-Party Submission document filed on Jan. 4, 2010 in related Japanese Patent Appln. No. 2004-251708.
Third-Party Submission document filed on Jan. 5, 2010 in related Japanese Patent Appln. No. 2004-251706.
Third-Party Submission document filed on Jan. 5, 2010 in related Japanese Patent Appln. No. 2004-251707.

(Continued)

*Primary Examiner* — Paul Marcantoni
(74) *Attorney, Agent, or Firm* — Birch, Stewart, Kolasch & Bicrh, LLP

(57) ABSTRACT

The problems to be solved by the invention are to provide a fiber reinforced cement composition for obtaining a fiber reinforced cement product which is inexpensive and economical, and to provide pushing forward disposal of defective products.
Namely, the fiber reinforced cement composition comprises a hydraulic inorganic material, a siliceous material, a woody reinforcement, a finely dividing fiber reinforced cement product and/or a finely dividing intermediate of fiber reinforced cement product which is produced by said raw materials.

15 Claims, No Drawings

OTHER PUBLICATIONS

Third-Party Submission Notice issued on Jan. 28, 2010 in related Japanese Patent Appln. No. 2004-251708.
Third-Party Submission Notice issued on Jan. 29, 2010 in related Japanese Patent Appln. No. 2004-251706.
Third-Party Submission Notice issued on Jan. 29, 2010 in related Japanese Patent Appln. No. 2004-251707.

* cited by examiner

FIBER REINFORCED CEMENT COMPOSITION AND PRODUCTS AND MANUFACTURING PROCESS

CROSS-REFERENCE TO RELATED APPLICATION

PCT/JP2005/015667
U.S. patent application Ser. No. 11/215,964
U.S. patent application Ser. No. 11/354,241
U.S. patent application Ser. No. 11/410,311
U.S. patent application Ser. No. 11/431,652

BACKGROUND OF THE INVENTION

1. Field of the Invention

The present invention relates to a fiber reinforced cement composition using a hydraulic inorganic material such as cement, products thereof and a manufacturing process thereof.

2. Description of the Related Art

The following description sets forth the inventor's knowledge of related art and problems therein and should not be construed as an admission of knowledge in the prior art.

Hitherto, for manufacturing process of fiber reinforced cement product, it is preferable to use wet forming manufacturing while dehydrating slurry and forming slurry which mixes water and powder material.

For this case, because size of green mat is bigger than size of product beforehand, the remainder which cut product from green mat occurs necessarily.

Furthermore, in an intermediate stage before becoming a product, there is defective product by various circumstances.

In addition, a product is hit during conveyance of a product somewhere, a lack occurs and it becomes defective product.

Disposal of these defective products takes trouble very much, and a cost is needed for processing.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Under such circumstances, the problems to be solved by the invention are to provide a fiber reinforced cement composition for obtaining a fiber reinforced cement product which is inexpensive and economical, and to provide pushing forward disposal of defective products.

The present invention provides, as a means to solve the conventional problems, a fiber reinforced cement composition comprising the following raw material: a hydraulic inorganic material, a siliceous material, a woody reinforcement, a finely dividing fiber reinforced cement product and/or a finely dividing intermediate of fiber reinforced cement product.

The effects of the present invention, it is possible to obtain a fiber reinforced cement product having good bending strength, dimensional stability and installation performance such as handling property, flexibility performance, nail performance and the like, and it is inexpensive and economical.

And, it is possible to push forward disposal of defective products.

The above and/or other aspects, features and/or advantages of various embodiments will be further appreciated in view of the following description. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE INVENTION

The present invention will be explained in detail below.

At first, each of the raw materials used for the fiber reinforced cement composition is explained.

[Hydraulic Inorganic Material]

A hydraulic inorganic material refers to a material which causes a hydration reaction upon contact with water to initiate hardening and includes cement and lime.

Among them, it is preferred to use portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for portland cement Type I, Type II, Type III, Type IV and Type V are included). Amongst, ordinary portland cement (according to ASTM C150, Type I, Type II or a blend thereof, and according to AASHTO (American Association of State Highway and Transportation Officials) M85, Type I) is inexpensive and is suitable for the use.

[Siliceous Material]

A siliceous material refers to a material which contains silica ($SiO_2$) as a chemical component.

In the present invention, examples of the siliceous material include silica sand, silica powder, diatomaceous earth, silica fume, fly ash, bottom ash, blast furnace slag, steel slag and sodium silicate.

Furthermore, it is preferable to use pearlstone and fly ash.

Pearlstone is composed mainly of glassy substances and the siliceous content thereof is as high as about 80% by mass.

If pearlstone is divided for use, it becomes enough silica component of calcium silicate reaction.

When fly ash is used as the siliceous material, while fly ash is very inexpensive and economical, in addition, the resulting product such as an external wall board is excellent in nail performance because the shape of fly ash is spherical.

It is preferable that the fly ash contains not less than 50% by mass and not more than 70% by mass of $SiO_2$ component.

Thus, it is preferable to use fly ash of Type F of ASTM C618. (Type F is not less than 70% by mass of $SiO_2+Al_2O_3+Fe_2O_3$.)

Then, it is preferable to use two kinds of the siliceous material which is an average particle size of not less than 15 μm and not more than 50 μm and an average particle size of not less than 1 μm and not more than 15 μm.

If the average particle size of siliceous material is less than 15 μm, there is danger that the lightweight effect deteriorates, and if the average particle size of the siliceous material is more than 50 m, there is danger that the surface characteristics of product deteriorates.

And if the average particle size of siliceous material is less than 1 μm, there is danger that the work efficiency turns worse, and if the average particle size of the siliceous material is more than 15 μm, there is danger that the reaction activity is not increased.

These siliceous material can use a just particle size, but it can be made in a predetermined particle size by mill such as roller mill and classifier such as air.

It is preferable in the present invention that the silica in the siliceous material is amorphous.

This is because a possibility of adverse effects (such as pneumoconiosis) of crystalline silica on a human body has been pointed out, just like asbestos cases.

It is possible to judge whether or not silica is crystalline by the appearance of the crystalline peaks of the crystalline silica contained in quartz, tridymite or cristobalite by an X-ray diffraction.

Namely, quartz or the like is crystalline and thus if the peaks of quartz or the like in an X-ray diffraction are observed in a siliceous material, the silica component contained in the siliceous material is crystalline rather than amorphous.

Accordingly, such a siliceous material in which the peaks observed in quartz or the like in an X-ray diffraction are not observed is used in the present invention.

Fly ash contains some amount of crystalline silica depending on the type (about 10% by mass of quartz). However, almost part of the crystalline silica contained in fly ash is converted to calcium silicate hydrates by calcium silicate reaction via curing in an autoclave and the crystalline silica almost disappears.

In addition, by finely dividing fly ash into an average particle size of not more than 15 μm, the reaction activity is enhanced.

Thus, a major part of the trace amount of crystalline silica contained in the fly ash is converted to calcium silicate hydrates and crystalline silica almost disappears.

Thus, by using finely divided fly ash, it is possible to eliminate, subsequent to asbestos, a recent concern about the health issue (such as oncogenesis) caused by crystalline silica.

Pearlstone is amorphous material, and there is not apprehension of health problem.

Furthermore, for strength improvement and for specific gravity setting, the following components may be optionally added; the other material contained amorphous silica such as silica fume and glass powder as siliceous material.

[Woody Reinforcement]

Examples of the woody reinforcement include woody pulp, wood fiber bundle, wood fiber, wood flake, wood wool and wood powder.

It is essential in the present invention to use used paper which is industrial waste.

It is possible to reduce the cost by using used paper as the woody reinforcement.

It is preferable to use used newspapers or corrugated cardboards as used paper.

Particularly, it is preferable to use #9 type of used paper.

The #9 type of used paper is newspapers which are leftover goods, and it does not include handbill and metal fragment.

It is preferable to use such used paper having a fiber length of not less than 0.5 mm and not more than 3.0 mm, a fiber diameter of not less than 10 μm and not more than 100 μm, and a Canadian standard freeness of not more than 350 ml.

If the fiber length of used paper is less than 0.5 mm, necessary reinforcement effect is not provided.

And if the fiber length of used paper is more than 3.0 mm, mixing property with powder deteriorates.

And, if the fiber diameter of used paper is less than 10 μm, necessary reinforcement effect is not provided.

If the fiber diameter of used paper is more than 100 μm, consistency of used paper in matrix becomes low, and reinforcement effect fades.

If CSF (Canadian standard freeness) of used paper is more than 350 ml, enough powder complementation in forming is not provided, whereby the resulting specific gravity of base material falls.

By adding the used paper in an appropriate amount, mixing property with powder (cement) is enhanced, thereby it is possible to obtain a fiber reinforced cement product excellent in handling property and nail performance.

Furthermore, it is preferable to use woody pulp, such as needle-leaves-tree unbleached kraft pulp (NUKP), needle-leaves-tree bleached kraft pulp (NBKP), Laubholz unbleached kraft pulp (LUKP) or Laubholz bleached kraft pulp (LBKP) with used paper, particularly, it is preferably to combine needle-leaves tree pulps such as NUKP and NBKP.

It is also preferable to use two kinds of woody reinforcement in a ratio of NUKP (NBKP) to used paper in a range of from 4:1 to 1:1.

If the ratio of used paper to NUKP (NBKP) is more than 1:1, the resulting product contains a small amount of long fibers and thus becomes difficult to develop strength, whereas if the ratio of NUKP (NBKP) to used paper is more than 4:1, mixing with cement (powder) becomes difficult.

It is preferable to set the freeness of pulp, i.e. the value measured according to Canadian standard measurement (Canadian standard freeness, hereinafter, sometimes referred to as CSF), which varies depending on the degree of beating of pulps, to be not more than 500 ml.

By using such a woody reinforcement of fine fibers, the woody reinforcement exists in a cement (powder) matrix at a high density to give a fiber reinforced cement product having an excellent toughness.

A woody reinforcement having a CSF of not less than 500 ml may be added as an auxiliary material.

[Mica]

Mica contributes to improvement in the dimensional stability of a product since it usually has a lamellar structure, is not hygroscopic and is a high elastic substance having a rigidity.

For example, if a fiber reinforced cement product without mica contains 15% to 18% by mass of water at the time when it is sold, the size of the product tends to shrink as the water content thereof decreases upon natural evaporation of the internal water under environmental conditions. However, if a fiber reinforced cement product contains mica, the dimension thereof does not largely change.

The mica used in the present invention is preferably in the form of flakes having an average particle size of not less than 200 μm and not more than 700 μm, and an aspect ratio of not less than 60 and not more than 100.

Incidentally, the aspect ratio herein means the ratio of thickness relative to particle size.

[Water-Soluble Resin]

Examples of the water-soluble resin include polyvinyl alcohols, carboxymethyl cellulose, methyl cellulose, polyethylene oxides and polyvinyl ethers.

The water-soluble resin serves as a binder in the fiber reinforced cement product, enhances adhesion among the layers of the components contained in the product, and improves the bending strength, as well as freezing and fusion resistance of the product.

In addition, since the water-soluble resin has a water-retention action, it prevents the surface of the fiber reinforced cement product from drying in the course of autoclave curing and acts to uniform the water content, thereby achieving a uniform hardening-curing reaction.

A desirable water-soluble resin is a powdery polyvinyl alcohol resin having a saponification value of not less than 98% by mol.

Incidentally, the term "saponification value" means a percentage of the number of hydroxyl group relative to the total number of acetate group and hydroxyl group contained in a polyvinyl alcohol resin in a saponification reaction (a reaction to synthesize a polyvinyl alcohol resin in by replacing the acetate group in a polyvinyl acetate with hydroxyl group).

A powdery polyvinyl alcohol resin having a saponification value of not less than 98% by mol is not soluble in water but merely swells at a normal temperature, and thus does not dissolve in the water of an aqueous slurry of raw materials at a normal temperature. Therefore, in the after-mentioned forming process, outflow of the polyvinyl alcohol resin is reduced, whereby the process yield does not decrease, and the viscosity of the slurry is not raised, whereby the forming efficacy does not decrease.

In the green sheet prepared by forming the slurry of raw materials, the powdery polyvinyl alcohol resin comes to dissolve in the water contained in the green sheet owing to the high temperature in an autoclave curing process. Because the water content of the green sheet is low, a major part of the powdery polyvinyl alcohol resin remains in the green sheet in a balloon state in which the powdery polyvinyl alcohol resin is dissolved in water and a large amount of the polyvinyl alcohol resin in the balloon state exists in a final product, i.e. a fiber reinforced cement product. Thus, the product is provided with a cushioning property due to the effect of the shape of the balloon, whereby the internal stress which generates during freezing and fusion is absorbed and alleviated to enhance freezing and fusion resistance.

In addition, when a water-soluble resin is added, the water-soluble resin coats the surface of the particles of cement as a protecting colloid, which possibly affects the hydration reaction of the cement. However, when a powdery polyvinyl alcohol resin is used, a major art of the resin remains in a balloon state in the green sheet. Thus it becomes difficult to coat the cement particles with the polyvinyl alcohol resin as a protecting colloid, whereby the effect of the resin on the hydration reaction of the cement is reduced.

[Finely Dividing Fiber Reinforced Cement Product]

Application of the fiber reinforced cement composition includes fiber reinforced cement sidings, glass fiber reinforced cement boards, pulp reinforced cement boards, wood fiber reinforced cement calcium silicate boards, fiber reinforced cement calcium silicate boards, slag cement perlite boards and like, and all of these final products are referred to as fiber reinforced cement products.

The finely dividing fiber reinforced cement product is divided defective articles of these products.

The defective articles include the broken product in which breaking off occurred during conveyance of product and defective product which did not become article of trade.

It is preferable that the average particle size of the finely dividing fiber reinforced cement products is not less than 15 µm and not more than 50 µm.

This finely dividing product contributed to hydration and hydrothermal reaction in what includes some non-reacting cement slightly, but large part of it becomes an aggregate factor.

Thus, if the average particle size of the finely dividing fiber reinforced cement products is less than 15 µm, base material becomes fragile, whereby the nail performance deteriorates.

And, if the average particle size of the finely dividing fiber reinforced cement products is more than 50 µm, whereby the deterioration of strength is caused.

At first fiber reinforced cement product is divided roughly by using striking type mill (primary dividing).

Striking type mil is mill in bombardment by striking, specifically it includes a hammer mill and an impact mill.

It is preferable that the particle size of roughly dividing fiber reinforced cement product by striking type mill is not less than 0.5 mm and not more than 20 mm.

Next, roughly dividing product which is dividing by using striking type mill is divided by using grinding type mill (second dividing).

Grinding type mill is mill by friction, for specifically it includes a ball mill, a roller mill, a vertical mill, bowl mill.

It is preferable that the particle size of finely dividing fiber reinforced cement product by grinding type mill is not less than 1 µm and not more than 500 µm.

Finely dividing product (second dividing product) may be just used, furthermore, for example, the finely dividing product can be separated in the range of 15 to 50 µm by means of sieve classification and air classification.

[Finely Dividing Intermediate of Fiber Reinforced Cement Product]

An intermediate of fiber reinforced cement product includes a green sheet which is formed raw material slurry, a green mat which is rolled up around a making roll to have a multi-layer structure and separated from the making roll, a press mat which is pressed the green mat, a hardening mat which is hardened the press mat, a curing mat which is cured the hardening mat, and a finely dividing intermediate of fiber reinforced cement product is divided defective articles of those intermediates.

About a particle size of finely dividing intermediate of fiber reinforced cement product, it is similar to finely dividing fiber reinforced cement products.

Because hydration reaction by hydraulic inorganic material in them is not completely completed, the finely dividing of green sheet, green mat and press mat still have reactivity.

Because hydration reaction by hydraulic inorganic material is completed, the finely dividing of hardening mat and curing mat have little reactivity, so large part of them becomes an aggregate factor, and it is a criteria same as fiber reinforced cement products.

To be exact, in hardening mat, hydration reaction of hydraulic inorganic material occurs, but calcium silicate reaction does not yet occurs, and in curing mat, calcium silicate reaction occurs too, therefore, a criteria same as fiber reinforced product is only a curing mat.

It is classified as the first group which includes the green sheet, the green mat and the press mat, and the second group which includes the hardened mat, curing mat and fiber reinforced cement product.

The first group may still causes hydration reaction, and the second group has few possibilities causing hydration reaction.

When both with the first group and the second group are added, it is added in a ratio of the first group to the second group in a range of from 9:1 to 5:5.

The second group is added a few amount, because the second group is to act as aggregate factor without having reactivity.

Intermediate of fiber reinforced cement product such as green sheet, green mat and press mat is the first group and becomes powders easily it can be done with material without using mill such as a roller mill, because hydration reaction is not completed.

For example, these roughly dividing mat dissolves in water, as a result of mixing these roughly dividing mat in water and stirring enough, so, it can be used as a part of material slurry.

Intermediate of fiber reinforced cement product such as hardening mat and curing mat is the second group and does not dissolve in water only mixing and stirring, because hydration reaction is occurred enough.

So the handling of thereof is the same as fiber reinforced cement product, both striking type mill and grinding type mill are used, and it powders same as fiber reinforced cement product.

[Other Component]

As the other components, the following components may be optionally added: mineral powders such as vermiculite, bentonite and dolomite; inorganic fibers such as wollastonite and glass fiber; organic fibers such as polypropylene fiber, acrylic fiber and aramid fiber; cement setting accelerators such as sodium aluminate, calcium formate, potassium sulfate, calcium sulfate, aluminum sulfate and calcium acetate; water-repellants or water-proofing agents such as wax, paraffin, silicone, succinic acid and surfactants.

Incidentally, these illustrations do not restrict the present invention.

Next, the composition of the raw materials for the above-mentioned fiber reinforced cement product is explained.

[Raw Material Composition of the Fiber Reinforced Composition]

The fiber reinforced cement composition is preferably composed of the following raw materials: not less than 25% by mass and not more than 45% by mass of a hydraulic inorganic material, not less than 50% by mass and not more than 65% by mass of a siliceous material, not less than 5% by mass and not more than 12% by mass of a woody reinforcement.

It is preferable to add not less than 1% by mass and not more than 5% by mass of the finely dividing fiber reinforced cement product, and it is preferable to add not less than 3% by mass and not more than 10% by mass of the finely dividing intermediate of fiber reinforced cement product.

Furthermore, it is preferable to add not less than 1% by mass and not more than 7% by mass of mica, and not less than 0.25% by mass and not more than 1.5% by mass of a water-soluble resin.

If the amount of the hydraulic inorganic material is less than 25% by mass, development of the strength after first hardening is not sufficient, whereas if it is more than 45% by mass, the resulting fiber reinforced cement product becomes rigid and fragile.

If the amount of siliceous material is less than 50% by mass, a siliceous component which reacts in calcium silicate reaction is not enough, whereas if it is more than 65% by mass, a calcium component is not enough to leave an unreacted siliceous component.

If the amount of the woody reinforcement is less than 5% by mass, a problem with regard to toughness of the resulting fiber reinforced cement product occurs, whereas if it is more than 12% by mass, uniform dispersion thereof in the raw materials becomes difficult.

If the amount of mica is less than 1% by mass, it does not contribute to the dimensional stability of the resulting fiber reinforced cement product, whereas if it is more than 7% by mass, uniform dispersion thereof in the raw materials becomes difficult.

If the amount of the water-soluble resin is less than 0.25% by mass, it does not contribute to the development of strength, whereas if it is more than 1.5% by mass, improvement in the physical properties of the resulting product is not achieved.

If the amount of the finely dividing fiber reinforced cement product is more than 5% by mass, ratio of aggregate material increases in material composition, and reactivity of the fiber reinforced cement composition decreases.

If the amount of the finely dividing intermediate of fiber reinforced cement product is more than 10% by mass, dispersion of product becomes large, and control of physical properties is difficult.

The raw materials of preferred fiber reinforced cement composition comprise not less than 28% by mass and not more than 32% by mass of portland cement as the hydraulic inorganic materials, not less than 54% by mass and not more than 58% by mass in total of pearlstone and fly ash as the siliceous material, wherein the amount of fly ash is not less than 25% by mass and not more than 75% by mass of the whole siliceous material consisting of pearlstone and fly ash, not less than 8% by mass and not more than 12% by mass in total of NUKP and/or NBKP and used paper as the woody reinforcement, wherein the amount of used paper is not less than 20% by mass and not more than 50% by mass of the whole woody reinforcement consisting of the NUKP and/or NBKP and the used paper, not less than 2% by mass and not more than 5% by mass of mica, not less than 0.5% by mass and not more than 1.25% by mass of a water-soluble resin.

In this case, it is preferable that the mass ratio of CaO to $SiO_2$ in the raw materials consisting of hydraulic inorganic material and the siliceous material is in a range of from 23:77 to 40:60.

It is possible to set this mass ratio by analyzing the chemical composition each of the hydraulic inorganic material and the siliceous material.

[Manufacturing Process]

In a process for manufacturing a fiber reinforced cement product, at first, the above-mentioned composition is mixed with water to give a slurry of raw materials.

The concentration of the slurry is in a range of from 3 to 15% by mass reduced to a concentration of solid content.

The slurry of raw materials is subjected to a wet manufacturing process.

Examples of the wet manufacturing processes include Hatschek process, flow on process, filter pressing process, roll forming, extrusion, injection, Mazza pipe process, Magnani sheet process, hand lay-up process, molding and casting. Flow on process is employed for forming herein.

The "flow on process" is a process in which a slurry of raw materials is flow down on an endless felt provided with a suction unit below the felt and formed with suction-dehydration to give a green sheet (i.e. a soft wet sheet), and the green sheet is rolled up around a making roll to give a multi-layer sheet, and when the thickness of the multi-layer sheet reaches a predetermined thickness, the sheet is removed from the making roll to give a green mat.

The number of rolling around the making roll is preferably 6 to 15.

Then, the green mat is pressed with a pressure of 2 to 5 MPa.

Incidentally, the green sheet is rolled up around the making roll in layers also in Hatschek process like in flow on process. In the Hatschek process, forming speed is high, and as the speed increases, the fibers are more readily orientated and the aspect ratio (length/breadth ratio) of the bending strength increases. On the other hand, in the flow on process in which raw materials are flown down on the felt, fibers are not so readily orientated as in the Hatschek process, and thus the aspect ratio of the bending strength is not so increased as in the Hatschek process.

In addition, since plural butts each accommodating a cylinder are provided and a felt is run on the cylinders in the butts to transfer the slurry of raw materials to the felt in the Hatschek process, the green sheet which has been formed and dehydrated on the felt and rolled up around the making roll produces a laminar structure having the number of layers equivalent to the number of the butts.

On the contrary, when the flow on process is employed, the resulting green sheet itself is not laminar structure but the green mat which the green sheet is rolled up around the making roll is a laminar structure having the number of layers equivalent to the number of rolling up around the making roll, and thus the resulting sheet has s freezing and fusion resistance better than that of the green sheet obtained by Hatschek process.

Furthermore, in the Hatschek process, a felt is run on the cylinders in the butts to transfer the slurry of raw materials to the felts, and thus it is necessary to increase the number of the butt to increase the thickness of the resulting fiber reinforced cement board. This is very uneconomical. On the other hand, in the flow on process, since the thickness of the board can be increased readily by increasing the amount of the slurry of raw materials to be flown down on the felt, the flow on process is economical. In addition, the bulk of the board can be increased prior to pressing in this process, whereby deep embosses can be formed on the green mat.

Therefore, it is preferable to adopt the flow on process.

In forming of this flow on process, it makes material slurry flow down on a felt, and it is dehydrated through the felt by aspiration.

And the green sheet is formed of between making roll from a place of flow on a felt.

Subsequently, the press molded mat obtained by pressing the green mat is hardened at 40 to 80° C. for 12 to 24 hours and then cured in an autoclave.

Curing in an autoclave is preferably effected by raising the temperature to 150 to 180° C. in 3.5 hours, keeping the temperature for 6.5 hours and lowering the temperature in 6 hours.

Upon autoclave curing under such conditions, a siliceous component and an alumina component elute from the surface of mica, thereby roughening the surface of mica.

In addition, the calcium component eluted from cement or the like is liable to enter into the space among overlapped parts of mica fragments, and the calcium component reacts with the siliceous component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure which has a better crystalline property than that of the other kind of tobermorite is produced in a large amount, whereby the dimensional stability of the product, as well as the freezing and fusion resistance of the product are enhanced.

If the amount of the calcium component is too much relative to the amount of the siliceous component, a cement hydration predominantly occurs rather than a calcium silicate reaction, whereby the resulting fiber reinforced cement product becomes fragile and the crack resistance thereof decreases.

On the contrary, if the amount of the siliceous component is too much relative to the amount of the calcium component, unreacted siliceous component remains in a large amount and production of tobermorite decreases, whereby the freezing and fusion resistance of the product decreases.

[Coating Method]

Coating of the fiber reinforced cement product is effected, for example, by coating with a sealer the front face twice and the ends and the rear face once, applying an undercoating such as an aqueous emulsion type acrylic resin paint or a silicone resin paint, applying as intermediate coating, and then applying a top coating such as an organic solvent solution type acrylic resin paint, an aqueous emulsion type acrylic resin paint or as organic solvent solution type silicone acrylic resin paint.

[Installation Method]

As method for installation of the fiber reinforced cement product, it is preferable to effect, for example, in the case of fiber reinforced cement sidings, by nailing a first siding at the positions about 20 mm inside from or below the upper edge thereof, placing a second siding on the first siding in such a manner that the lower edge of the second siding overlaps the upper edge of the first siding by not less than 30 mm, and then nailing the second siding at the positions about 20 mm inside from the upper edge thereof according to a so-called lap boarding.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferable" is non-exclusive and means "preferable, but not limited to".

In this disclosure and during the prosecution of this application, the terminology "present invention" or "invention" is meant as non-specific, general reference and may be used as a reference to one or more aspect within the present disclosure.

The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims.

In this disclosure and during the prosecution of this application, the terminology "embodiment" can be used to describe any aspect, feature, process or step, any combination thereof, and/or any portion thereof, etc. In some examples, various embodiments may include overlapping features.

DESCRIPTION OF THE PREFERRED EMBODIMENTS

In the following paragraphs, some preferred embodiments of the invention will be described with reference to the attached drawing by way of example and not limitation.

It should be understood based on this disclosure that various other modifications can be made by those in the art based on these illustrated embodiments.

Embodiment 1

Examples 1 to 8 and Comparisons 1 to 4 of the present invention will be illustrated by Embodiment 1.

Table 1

Table 1 shows the compositions of the raw materials used in Examples 1 to 8 according to the present invention.

The raw materials having the composition shown in the table are mixed, and water is added thereto to give a slurry of raw materials having a solid concentration of 10% by mass.

TABLE 1

| Raw material composition (% by mass) | Example 1 | Example 2 | Example 3 | Example 4 | Example 5 | Example 6 | Example 7 | Example 8 |
|---|---|---|---|---|---|---|---|---|
| Portland cement | 30 | 30 | 30 | 30 | 30 | 30 | 30 | 30 |
| Finely dividing fly ash | 28 | 28 | 28 | 28 | 28 | 28 | 28 | 28 |
| pearlstone | 25 | 23 | 25 | 23 | 21 | 18 | 18 | 18 |
| Finely dividing fiber reinforced cement product | 3 | 5 | 0 | 0 | 0 | 0 | 3 | 5 |
| Finely dividing intermediate of fiber reinforced cement product (forming mat) | 0 | 0 | 3 | 5 | 7 | 10 | 7 | 5 |
| NUKP | 8 | 8 | 8 | 8 | 8 | 8 | 8 | 8 |
| NBKP | 0 | 0 | 0 | 0 | 0 | 0 | 0 | 0 |
| Used newspapers | 2 | 2 | 2 | 2 | 2 | 2 | 2 | 2 |
| Mica | 3 | 3 | 3 | 3 | 3 | 3 | 3 | 3 |
| Polyvinyl alcohol resin | 1 | 1 | 1 | 1 | 1 | 1 | 1 | 1 |

The slurry is caused to flow down on a felt and formed with dehydration to give a green sheet. The green sheet is rolled up around a making roll to give a multilayer structure. When the thickness of the sheet reaches a predetermined value, the sheet is separated from the making roll to give a green mat. The mat is pressed with a pressure of 5 MPa, hardened and cured at 80° C. for 15 hours, and further cured in an autoclave at 170° C. for 7 hours to provide a fiber reinforced cement product.

Table 2

Table 2 shows physical properties of the products of Examples 1 to 8 according to the present invention.

Bending strength and Young's modulus are measured using a test piece of 70×200 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the test piece at 20° C. under RH of 60% for 10 days and then drying it at 80° C. for 10 days to allow moisture effusion.

Microcracking test (cycle) means the number of cycles until cracks occur, wherein one cycle consists of a water absorption-drying procedure repeated 3 times in one week, said procedure consisting of carbonation for 4 days, water absorption for 7 hours and drying at 120° C. for 17 hours.

Freezing and fusion resistance is a percentage of expansion in thickness after 300 cycles according to ASTM C166-B method.

Nailing performance is determined by observing generation of cracks when two fiber reinforced cement products which are laid to overlap with each other by 30 mm according to the lap boardind are pegged with nails of 2.3 mm in diameter and 38 mm in length by means of nailer gun at the positions of the overlapped part of the products 20 mm inside from the edges of the overlapped part in the longitudinal direction and in the shorter direction in compliance with actual installation.

The mark "○" denotes no cracking and the mark "X" denotes generation of cracks.

TABLE 2

| Physical property | Example 1 | Example 2 | Example 3 | Example 4 | Example 5 | Example 6 | Example 7 | Example 8 |
|---|---|---|---|---|---|---|---|---|
| Absolute dry specific gravity | 1.23 | 1.22 | 1.24 | 1.23 | 1.22 | 1.21 | 1.20 | 1.20 |
| Young's modulus (kN/mm$^2$) | 5.5 | 5.3 | 5.7 | 5.6 | 5.4 | 5.2 | 5.0 | 5.0 |
| Bending strength (N/mm$^2$) | 20.5 | 20.2 | 20.8 | 20.6 | 20.4 | 20.0 | 19.7 | 19.8 |
| Elongation ratio through water absorption (%) | 0.12 | 0.12 | 0.11 | 0.11 | 0.12 | 0.12 | 0.12 | 0.12 |
| Contraction ratio through moisture effusion (%) | 0.13 | 0.13 | 0.12 | 0.12 | 0.13 | 0.13 | 0.13 | 0.13 |
| Microcracking test (cycle) | 10 | 10 | 10 | 10 | 10 | 10 | 10 | 10 |
| Freezing and fusion resistance (%) | 1.2 | 1.5 | 1.0 | 1.1 | 1.3 | 1.6 | 1.7 | 1.8 |
| Nail performance | ○ | ○ | ○ | ○ | ○ | ○ | ○ | ○ |
| Presence or absence of crystalline silica | Scarcely present | Scarcely present | Scarcely present | Scarcely present | Scarcely present | Scarcely present | Scarcely present | Scarcely present |

The presence of crystalline silica was determined by appearance of the peaks observed in crystalline silica such as quartz, tridymite or cristobalite in an X-ray diffraction.

Example 1

The fiber reinforced cement product of Example 1, in which the amount of finely dividing fiber reinforced cement product is 3% by mass, is excellent in physical properties such as bending strength, young's modulus, elongation ratio through water absorption, contraction ratio through moisture effusion, microcracking test, freezing and fusion resistance and nail performance.

Example 2

The fiber reinforced cement product of Example 2, in which the amount of finely dividing fiber reinforced cement product is 5% by mass, is excellent in physical properties such as bending strength, young's modulus, elongation ratio through water absorption, contraction ratio through moisture effusion, microcracking test, freezing and fusion resistance and nail performance.

Example 3

The fiber reinforced cement product of Example 3, in which the amount of finely dividing intermediate of fiber reinforced cement product is 3% by mass, is excellent in physical properties such as bending strength, young's modulus, elongation ratio through water absorption, contraction ratio through moisture effusion, microcracking test, freezing and fusion resistance and nail performance.

Example 4

The fiber reinforced cement product of Example 4, in which the amount of finely dividing intermediate of fiber reinforced cement product is 5% by mass, is excellent in physical properties such as bending strength, young's modulus, elongation ratio through water absorption, contraction ratio through moisture effusion, microcracking test, freezing and fusion resistance and nail performance.

Example 5

The fiber reinforced cement product of Example 5, in which the amount of finely dividing intermediate of fiber reinforced cement product is 7% by mass, is excellent in physical properties such as bending strength, young's modulus, elongation ratio through water absorption, contraction ratio through moisture effusion, microcracking test, freezing and fusion resistance and nail performance.

Example 6

The fiber reinforced cement product of Example 6, in which the amount of finely dividing intermediate of fiber reinforced cement product is 10% by mass, is slightly poor freezing and fusion resistance but is excellent in physical properties such as bending strength, young's modulus, elongation ratio through water absorption, contraction ratio through moisture effusion, microcracking test and nail performance.

Example 7

The fiber reinforced cement product of Example 7, in which the amount of finely dividing fiber reinforced cement product is 3% by mass and the amount of finely dividing intermediate of fiber reinforced cement product is 7% by mass, is slightly poor freezing and fusion resistance but is excellent in physical properties such as bending strength, young's modulus, elongation ratio through water absorption, contraction ratio through moisture effusion, microcracking test and nail performance.

Example 8

The fiber reinforced cement product of Example 8, in which the amount of finely dividing fiber reinforced cement product is 5% by mass and the amount of finely dividing intermediate of fiber reinforced cement product is 5% by mass, is slightly poor freezing and fusion resistance but is excellent in physical properties such as bending strength, young's modulus, elongation ratio through water absorption, contraction ratio through moisture effusion, microcracking test and nail performance.

Table 3

Table 3 shows the compositions of the raw materials of Comparisons 1 to 4 in which the fiber reinforced cement products were manufactured by a process similar to that in the examples.

Table 4

Table 4 shows various physical properties of the fiber reinforced cement products of Comparisons 1 to 4 in which the fiber reinforced cement products were measured in a manner similar to that in the examples.

Comparison 1

The fiber reinforced cement product of Comparison 1 is a blank, in which not added the finely dividing fiber reinforced cement product and finely dividing intermediate of fiber reinforced cement product.

TABLE 3

| Raw material composition (% by mass) | Comparison 1 | Comparison 2 | Comparison 3 | Comparison 4 |
|---|---|---|---|---|
| Portland cement | 30 | 29 | 26 | 26 |
| Finely dividing fly ash | 28 | 25 | 24 | 23 |
| pearlstone | 28 | 25 | 24 | 23 |
| Finely dividing fiber reinforced cement product | 0 | 7 | 0 | 5 |
| Finely dividing intermediate of fiber reinforced cement product (forming mat) | 0 | 0 | 12 | 10 |
| NUKP | 8 | 8 | 8 | 7 |
| NBKP | 0 | 0 | 0 | 0 |
| Used newspapers | 2 | 2 | 2 | 2 |
| Mica | 3 | 3 | 3 | 3 |
| Polyvinyl alcohol resin | 1 | 1 | 1 | 1 |

TABLE 4

| Physical property | Comparison 1 | Comparison 2 | Comparison 3 | Comparison 4 |
|---|---|---|---|---|
| Absolute dry specific gravity | 1.24 | 1.18 | 1.19 | 1.15 |
| Young's modulus (kN/mm$^2$) | 5.7 | 4.7 | 4.8 | 4.2 |
| Bending strength (N/mm$^2$) | 20.7 | 17.9 | 18.2 | 15.3 |
| Elongation ratio through water absorption (%) | 0.11 | 0.14 | 0.13 | 0.15 |
| Contraction ratio through moisture effusion (%) | 0.12 | 0.15 | 0.14 | 0.16 |
| Microcracking test (cycle) | 10 | 8 | 8 | 8 |
| Freezing and fusion resistance (%) | 1.1 | 2.3 | 2.1 | 4.0 |
| Nail performance | ◯ | ◯ | ◯ | ◯ |
| Presence or absence of crystalline silica | Scarcely present | Scarcely present | Scarcely present | Scarcely present |

Examples 1 to 8 show the value that does not have inferiority in comparison with this blank.

Comparison 2

The fiber reinforced cement product of Comparison 2, in which the amount of finely dividing fiber reinforced cement product is 7% by mass, has low absolute dry specific gravity, and is slightly poor in physical properties such as elongation ratio through water absorption, contraction ratio through moisture effusion and bending strength, and is poor in physical properties such as freezing and fusion resistance.

Comparison 3

The fiber reinforced cement product of Comparison 3, in which the amount of finely dividing intermediate of fiber reinforced cement product is 12% by mass, has low absolute dry specific gravity, and is slightly poor in physical properties such as elongation ratio through water absorption, contraction ratio through moisture effusion and bending strength, and is poor in physical properties such as freezing and fusion resistance.

Comparison 4

The fiber reinforced cement product of Comparison 4, in which the amount of finely dividing fiber reinforced cement product is 5% by mass and the amount of finely dividing intermediate of fiber reinforced cement product is 10% by mass, has considerably low absolute dry specific gravity, and is considerably poor in physical properties such as elongation ratio through water absorption, contraction ratio through moisture effusion, bending strength and freezing and fusion resistance.

What is claimed is:

1. A fiber reinforced cement composition comprising the following raw materials:
    a hydraulic inorganic material;
    a siliceous material, a woody reinforcement;
    fiber reinforced cement particles of a fiber reinforced cement product and/or fiber reinforced cement particles of a fiber reinforced cement intermediate product;
    mica; and
    polyvinyl alcohol resin, wherein
    the hydraulic inorganic material is contained in the amount of 28-45% by mass,
    the fiber reinforced cement particles of the fiber reinforced cement product has average particle size of 15-50 μm,
    the fiber reinforced cement particles of the fiber reinforced cement intermediate product are obtained by grinding and/or milling a green sheet which is obtained by forming slurry of raw materials and/or a green mat which is obtained by rolling up on a making roll to have a multilayer structure and separating from the making roll and/or a press mat which is obtained by pressing a green mat and/or a hardening mat which is hardened by a press mat and/or a cured mat which is obtained by curing the hardening mat and/or a defective article thereof,
    the fiber reinforced cement particles of the fiber reinforced cement product is contained in the amount of 1-5% by mass and/or the fiber reinforced cement particles of the fiber reinforced cement intermediate product is contained in the amount of 3-10% by mass, and
    the woody reinforcement comprises needle-leaves-tree unbleached kraft pulp and/or needle-leaves-tree bleached kraft pulp and used newspaper.

2. The fiber reinforced cement composition according to claim 1, wherein
    the ratio of the total amount of the fiber reinforced cement particles of the fiber reinforced cement intermediate product being obtained by grinding and/or milling the green sheet and/or the green mat and/or the press mat to the total amount of the fiber reinforced cement particles of the fiber reinforced cement intermediate product being obtained by grinding and/or milling the hardening mat and/or the cured mat and/or the fiber reinforced cement product is in a range of from 9:1 to 5:5 by mass.

3. A fiber reinforced cement composition comprising the following raw materials:
    not less than 28% by mass and not more than 32% by mass of a hydraulic inorganic material;
    not less than 54% by mass and not more than 58% by mass of a siliceous material;
    not less than 8% by mass and not more than 12% by mass of a woody reinforcement;
    not less than 1% by mass and not more than 5% by mass of a fiber reinforced cement particles of a fiber reinforced cement product;
    not less than 3% by mass and not more than 10% by mass of fiber reinforced cement particles of a fiber reinforced cement intermediate product;
    not less than 2% by mass and not more than 5% by mass of mica; and
    not less than 0.5% by mass and not more than 1.25% by mass of polyvinyl alcohol resin, wherein
    the fiber reinforced cement particles of the fiber reinforced cement product has average particle size of 15-50 μm,
    the fiber reinforced cement particles of the fiber reinforced cement intermediate product are obtained by grinding and/or milling a green sheet which is obtained by forming slurry of raw materials and/or a green mat which is obtained by rolling up on a making roll to have a multilayer structure and separating from the making roll and/or a press mat which is obtained by pressing a green mat and/or a hardening mat which is hardened by a press mat and/or a cured mat which is obtained by curing the hardening mat and/or a defective article thereof, and
    the woody reinforcement comprises needle-leaves-tree unbleached kraft pulp and/or needle-leaves-tree bleached kraft pulp and used newspaper.

4. The fiber reinforced cement composition according to claim 3, wherein
    the hydraulic inorganic material is portland cement,
    the siliceous material is pearlstone and fly ash,
    the amount of fly ash is not less than 25% by mass and not more than 75% by mass of the whole siliceous material consisting of pearlstone and fly ash,
    the amount of the used newspaper is not less than 20% by mass and not more than 50% by mass of the whole woody reinforcement consisting of used newspaper and the needle-leaves-tree unbleached kraft pulp and/or the needle-leaves-tree bleached kraft pulp.

5. The fiber reinforced cement composition according to claim 1, wherein,
    the amount of the siliceous material is not less than 50% by mass and not more than 65% by mass,
    the amount of the woody reinforcement is not less than 5% by mass and not more than 12% by mass,
    the amount of the mica is not less than 1% by mass and not more than 7% by mass, and
    the amount of the polyvinyl alcohol resin not less than 0.25% by mass and not more than 1.5% by mass.

6. A fiber reinforced cement product comprising the following raw materials:
    a hydraulic inorganic material;
    a siliceous material, a woody reinforcement;
    fiber reinforced cement particles of a fiber reinforced cement product and/or fiber reinforced cement particles of a fiber reinforced cement intermediate product;

mica; and polyvinyl alcohol resin, wherein the hydraulic inorganic material is contained in the amount of 28-45% by mass, the fiber reinforced cement particles of the fiber reinforced cement product has average particle size of 15-50 µm, the fiber reinforced cement particles of the fiber reinforced cement intermediate product are obtained by grinding and/or milling a green sheet which is obtained by forming slurry of raw materials and/or a green mat which is obtained by rolling up on a making roll to have a multi-layer structure and separating from the making roll and/or a press mat which is obtained by pressing a green mat and/or a hardening mat which is hardened by a press mat and/or a cured mat which is obtained by curing the hardening mat and/or a defective article thereof, the fiber reinforced cement particles of the fiber reinforced cement product is contained in the amount of 1-5% by mass and/or the fiber reinforced cement particles of the fiber reinforced cement intermediate product is contained in the amount of 3-10% by mass, and the woody reinforcement comprises needle-leaves-tree unbleached kraft pulp and/or needle-leaves-tree bleached kraft pulp and used newspaper.

7. The fiber reinforced cement product according to claim 6, wherein the ratio of the total amount of the fiber reinforced cement particles of the fiber reinforced cement intermediate product being obtained by grinding and/or milling the green sheet and/or the green mat and/or the press mat to the total amount of the fiber reinforced cement particles of the fiber reinforced cement intermediate product being obtained by grinding and/or milling the hardening mat and/or the cured mat and/or the fiber reinforced cement product is in a range of from 9:1 to 5:5 by mass.

8. The fiber reinforced cement product according to claim 6, wherein, the amount of the siliceous material is not less than 50% by mass and not more than 65% by mass, the amount of the woody reinforcement is not less than 5% by mass and not more than 12% by mass, the amount of the mica is not less than 1% by mass and not more than 7% by mass, and the amount of the polyvinyl alcohol resin not less than 0.25% by mass and not more than 1.5% by mass.

9. A fiber reinforced cement product comprising the following raw materials:

not less than 28% by mass and not more than 32% by mass of a hydraulic inorganic material;

not less than 54% by mass and not more than 58% by mass of a siliceous material;

not less than 8% by mass and not more than 12% by mass of a woody reinforcement;

not less than 1% by mass and not more than 5% by mass of a fiber reinforced cement particles of a fiber reinforced cement product;

not less than 3% by mass and not more than 10% by mass of fiber reinforced cement particles of a fiber reinforced cement intermediate product;

not less than 2% by mass and not more than 5% by mass of mica; and not less than 0.5% by mass and not more than 1.25% by mass of polyvinyl alcohol resin, wherein the fiber reinforced cement particles of the fiber reinforced cement product has average particle size of 15-50 µm, the fiber reinforced cement particles of the fiber reinforced cement intermediate product are obtained by grinding and/or milling a green sheet which is obtained by forming slurry of raw materials and/or a green mat which is obtained by rolling up on a making roll to have a multi-layer structure and separating from the making roll and/or a press mat which is obtained by pressing a green mat and/or a hardening mat which is hardened by a press mat and/or a cured mat which is obtained by curing the hardening mat and/or a defective article thereof, and the woody reinforcement comprises needle-leaves-tree unbleached kraft pulp and/or needle-leaves-tree bleached kraft pulp and used newspaper.

10. The fiber reinforced cement product according to claim 9, wherein the hydraulic inorganic material is portland cement, the siliceous material is pearlstone and fly ash, the amount of fly ash is not less than 25% by mass and not more than 75% by mass of the whole siliceous material consisting of pearlstone and fly ash, and the amount of the used newspaper is not less than 20% by mass and not more than 50% by mass of the whole woody reinforcement consisting of used newspaper and the needle-leaves-tree unbleached kraft pulp and/or the needle-leaves-tree bleached kraft pulp.

11. A process for manufacturing a fiber reinforced cement product which comprises the following steps:

preparing a slurry of raw materials by dispersing in water following raw materials:

a hydraulic inorganic material;

a siliceous material, a woody reinforcement;

fiber reinforced cement particles of a fiber reinforced cement product and/or fiber reinforced cement particles of a fiber reinforced cement intermediate product;

mica; and polyvinyl alcohol resin, wherein the hydraulic inorganic material is contained in the amount of 28-45% by mass, the fiber reinforced cement particles of the fiber reinforced cement product has average particle size of 15-50 mm, the fiber reinforced cement particles of the fiber reinforced cement intermediate product are obtained by grinding and/or milling a green sheet which is obtained by forming slurry of raw materials and/or a green mat which is obtained by rolling up on a making roll to have a multi-layer structure and separating from the making roll and/or a press mat which is obtained by pressing a green mat and/or a hardening mat which is hardened by a press mat and/or a cured mat which is obtained by curing the hardening mat and/or a defective article thereof, the fiber reinforced cement particles of the fiber reinforced cement product is contained in the amount of 1-5% by mass and/or the fiber reinforced cement particles of the fiber reinforced cement intermediate product is contained in the amount of 3-10% by mass, and the woody reinforcement comprises needle-leaves-tree unbleached kraft pulp and/or needle-leaves-tree bleached kraft pulp and used newspaper;

forming the slurry of raw materials to obtain a green mat by;

press-molding the green mat to obtain a press mat; and curing the press mat in autoclave.

12. The process for manufacturing the fiber reinforced cement product according to claim 11, wherein the ratio of the total amount of the fiber reinforced cement particles of the fiber reinforced cement intermediate product being obtained by grinding and/or milling the green sheet and/or the green mat and/or the press mat to the total amount of the fiber reinforced cement particles of the fiber reinforced cement intermediate product being obtained by grinding and/or milling the hardening mat and/or the cured mat and/or the fiber reinforced cement product is in a range of from 9:1 to 5:5 by mass.

13. The process for manufacturing the fiber reinforced cement product according to claim 11, wherein,
the amount of the siliceous material is not less than 50% by mass and not more than 65% by mass,
the amount of the woody reinforcement is not less than 5% by mass and not more than 12% by mass,
the amount of the mica is not less than 1% by mass and not more than 7% by mass, and
the amount of the polyvinyl alcohol resin not less than 0.25% by mass and not more than 1.5% by mass.

14. A process for manufacturing a fiber reinforced cement product which comprises the following steps:
preparing a slurry of raw materials by dispersing in water following raw materials:
not less than 28% by mass and not more than 32% by mass of a hydraulic inorganic material;
not less than 54% by mass and not more than 58% by mass of a siliceous material;
not less than 8% by mass and not more than 12% by mass of a woody reinforcement;
not less than 1% by mass and not more than 5% by mass of a fiber reinforced cement particles of a fiber reinforced cement product;
not less than 3% by mass and not more than 10% by mass of fiber reinforced cement particles of a fiber reinforced cement intermediate product;
not less than 2% by mass and not more than 5% by mass of mica; and
not less than 0.5% by mass and not more than 1.25% by mass of polyvinyl alcohol resin, wherein the fiber reinforced cement particles of the fiber reinforced cement product has average particle size of 15-50 μm,
the fiber reinforced cement particles of the fiber reinforced cement intermediate product are obtained by grinding and/or milling a green sheet which is obtained by forming slurry of raw materials and/or a green mat which is obtained by rolling up on a making roll to have a multilayer structure and separating from the making roll and/or a press mat which is obtained by pressing a green mat and/or a hardening mat which is hardened by a press mat and/or a cured mat which is obtained by curing the hardening mat and/or a defective article thereof, and
the woody reinforcement comprises needle-leaves-tree unbleached kraft pulp and/or needle-leaves-tree bleached kraft pulp and used newspaper;
forming the slurry of raw materials to obtain a green mat by;
press-molding the green mat to obtain a press mat; and
curing the press mat in autoclave.

15. The process for manufacturing the fiber reinforced cement product according to claim 14, wherein
the hydraulic inorganic material is portland cement,
the siliceous material is pearlstone and fly ash,
the amount of fly ash is not less than 25% by mass and not more than 75% by mass of the whole siliceous material consisting of pearlstone and fly ash, and
the amount of the used newspaper is not less than 20% by mass and not more than 50% by mass of the whole woody reinforcement consisting of used newspaper and the needle-leaves-tree unbleached kraft pulp and/or the needle-leaves-tree bleached kraft pulp.

* * * * *